(12) United States Patent
Savolainen et al.

(10) Patent No.: US 9,380,580 B2
(45) Date of Patent: Jun. 28, 2016

(54) METHOD AND APPARATUS FOR TRANSMISSION SYNCHRONIZATION UTILIZING A ROUTER ADVERTISEMENT

(75) Inventors: Teemu Ilmari Savolainen, Helsinki (FI); Johanna Nieminen, Espoo (FI); Markus Sakari Isomaki, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/375,651

(22) PCT Filed: Apr. 4, 2012

(86) PCT No.: PCT/IB2012/051675
§ 371 (c)(1),
(2), (4) Date: Oct. 21, 2014

(87) PCT Pub. No.: WO2013/150339
PCT Pub. Date: Oct. 10, 2013

(65) Prior Publication Data
US 2015/0305022 A1   Oct. 22, 2015

(51) Int. Cl.
*H04W 72/04* (2009.01)
*H04W 52/02* (2009.01)
*H04L 12/807* (2013.01)
*H04W 56/00* (2009.01)
*H04W 88/04* (2009.01)

(52) U.S. Cl.
CPC ........... *H04W 72/0446* (2013.01); *H04L 47/27* (2013.01); *H04W 52/0206* (2013.01); *H04W 52/0216* (2013.01); *H04W 52/0219* (2013.01); *H04W 56/00* (2013.01); *H04W 88/04* (2013.01)

(58) Field of Classification Search
CPC . H04W 72/02; H04W 72/04; H04W 72/0446; H04W 52/0206; H04W 52/0216; H04W 52/0219; H04W 56/00; H04W 56/001
See application file for complete search history.

(56) References Cited

U.S. PATENT DOCUMENTS

| | | |
|---|---|---|
| 2005/0143145 A1 | 6/2005 | Maekawa |
| 2005/0265360 A1* | 12/2005 | Kim ................... H04L 12/2854 370/400 |
| 2006/0259523 A1 | 11/2006 | Wallis et al. |
| 2006/0268891 A1* | 11/2006 | Heidari-Bateni . H04W 52/0216 370/395.4 |
| 2007/0159992 A1 | 7/2007 | Kim |
| 2010/0074180 A1 | 3/2010 | Palanki et al. |
| 2010/0124240 A1 | 5/2010 | Lu et al. |
| 2010/0226342 A1 | 9/2010 | Colling et al. |
| 2012/0063436 A1* | 3/2012 | Thubert ................. H04L 45/04 370/338 |

OTHER PUBLICATIONS

Office action received for corresponding Vietnamese Patent Application No. 1-2014-03153, dated Jan. 28, 2015, 1 page.
(Continued)

*Primary Examiner* — Anh Ngoc Nguyen
(74) *Attorney, Agent, or Firm* — Alston & Bird LLP

(57) ABSTRACT

Various methods are described for determining a communications window for served nodes and internal applications in order to optimize power consumption. One example method may comprise determining a communications window for a plurality of served nodes. The method of this embodiment may also include causing the communications window to be signaled to the plurality served nodes. The method of this embodiment may also include causing a communications interface to be activated during the communications window in an instance in which at least one packet is received for at least one served node of the plurality of served nodes.

20 Claims, 7 Drawing Sheets

(56) References Cited

OTHER PUBLICATIONS

Haverinen et al., "Energy Consumption Of Always-On Applications In WCDMA Networks", IEEE 65th Vehicular Technology Conference, Apr. 22-25, 2007, pp. 964-968.

Narten et al., "Neighbor Discovery For IP version 6 (IPv6)", Request for Comments: 4861, Category: Standards Track, Sep. 2007, pp. 1-97.

Mathew et al., "Energy-Efficient Bootstrapping For Wireless Sensor Networks", Innovations in Systems and Software Engineering, vol. 1, Issue 2, Sep. 2005, 16 pages.

Keshav et al., "Energy Efficient Scheduling In 4G Smart Phones For Mobile Hotspot Application", National Conference on Communications, Feb. 3-5, 2012, 5 pages.

"Power Management In Wireless Networks", CSE, Retrieved on Sep. 26, 2014, Webpage available at : http://www.cse.wustl.edu/~jain/cse574-06/ftp/energy_mgmt/index.html.

Wu et al., "Fully Adaptive Power Saving Protocols For Ad Hoc Networks Using The Hyper Quorum System", The 28th International Conference on Distributed Computing Systems, Jun. 17-20, 2008, pp. 785-792.

International Search Report and Written Opinion received for corresponding Patent Cooperation Treaty Application No. PCT/IB2012/051675, dated Mar. 13, 2013, 16 pages.

Extended European Search Report received for corresponding European Patent Application No. 12873488.6, dated Oct. 13, 2015, 6 pages.

* cited by examiner

METHOD AND APPARATUS FOR TRANSMISSION SYNCHRONIZATION UTILIZING A ROUTER ADVERTISEMENT

RELATED APPLICATION

This application was originally filed as PCT Application No. PCT/IB2012/051675 filed on Apr. 4, 2012.

TECHNICAL FIELD

Embodiments of the present invention relate generally to communication technology, and, more particularly, relate to a method and apparatus for transmission synchronization related to power consumption.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer. Nodes, such as computing devices, sensors, other wireless devices and/or the like, may be configured to communicate via a gateway either by using internet protocol (IP) packets or by using proprietary protocols. In the former case the gateway may behave as a router, and in the latter case as a proxy, a translator, or as an application level gateway. These gateways may receive a consent barrage of packets from the plurality of nodes, such that the gateway is constantly connected to the network. Each time one of the plurality of nodes transmits a packet, the gateway must activate its Internet connection, such as a cellular radio, to transmit the packet. In instances in which the gateway is a battery powered gateway, for example mobile terminals using a cellular radio network as an uplink (UL), the gateway may be limited in its handling of the IP packets from the plurality of connected or served nodes based on overall battery life.

SUMMARY

Methods, apparatuses, and computer program products are herein provided for causing a communications window to be established in an instance in which a mobile terminal is configured to function as a gateway. The communications window may be configured such that it provides synchronized communications that result in reduced energy consumption. In some example embodiments, reduced energy consumption may be accomplished by causing a transmission indicating a future communications window, for example a time when an uplink radio is to be active, to be signaled to a plurality of served nodes. Such a transmission enables the served nodes to adjust the timing of future packet transmissions based on the indicated future communications window. Alternatively or additionally, an exact moment for a future communication may also be indicated to the served nodes. In some example embodiments, applications that are executing on the mobile terminal may also be configured to transmit packets during the indicated communications window and/or during another instance in which the cellular radio is operational. In some example embodiments, the gateway may cause packets received from served nodes, and/or packets from internal applications to be delayed for a predetermined amount of time or until a plurality of packets may be sent in at the same or similar times.

In one embodiment, a method is provided that comprises determining a communications window for a plurality of served nodes. The method of this embodiment may also include causing the communications window to be signaled to the plurality of served nodes. The method of this embodiment may also include causing a communications interface to be activated during the communications window in an instance in which at least one packet is received for at least one served node of the plurality of served nodes.

In another embodiment, an apparatus is provided that includes at least one processor and at least one memory including computer program code with the at least one memory and the computer program code being configured, with the at least one processor, to cause the apparatus to at least determine a communications window for a plurality of served nodes. The at least one memory and computer program code may also be configured to, with the at least one processor, cause the apparatus to cause the communications window to be signaled to the plurality of served nodes. The at least one memory and computer program code may also be configured to, with the at least one processor, cause the apparatus to cause a communications interface to be activated during the communications window in an instance in which at least one packet is received for at least one served node of the plurality of served nodes.

In the further embodiment, a computer program product may be provided that includes at least one non-transitory computer-readable storage medium having computer-readable program instructions stored therein with the computer-readable program instructions including program instructions configured to determine a communications window for a plurality of served nodes. The computer-readable program instructions may also include program instructions configured to cause the communications window to be signaled to the plurality of served nodes. The computer-readable program instructions may also include program instructions configured to cause a communications interface to be activated during the communications window in an instance in which at least one packet is received for at least one served node of the plurality of served nodes.

In yet another embodiment, an apparatus is provided that includes means for determining a communications window for a plurality of served nodes. The apparatus of this embodiment may also include means for means for causing the communications window to be signaled to the plurality of served nodes. The apparatus of this embodiment may also include means for means for causing a communications interface to be activated during the communications window in an instance in which at least one packet is received for at least one served node of the plurality of served nodes.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described some example embodiments of the invention in general terms, reference will now be made to the accompanying drawings, which are not necessarily drawn to scale, and wherein:

DETAILED DESCRIPTION

Figure 1:
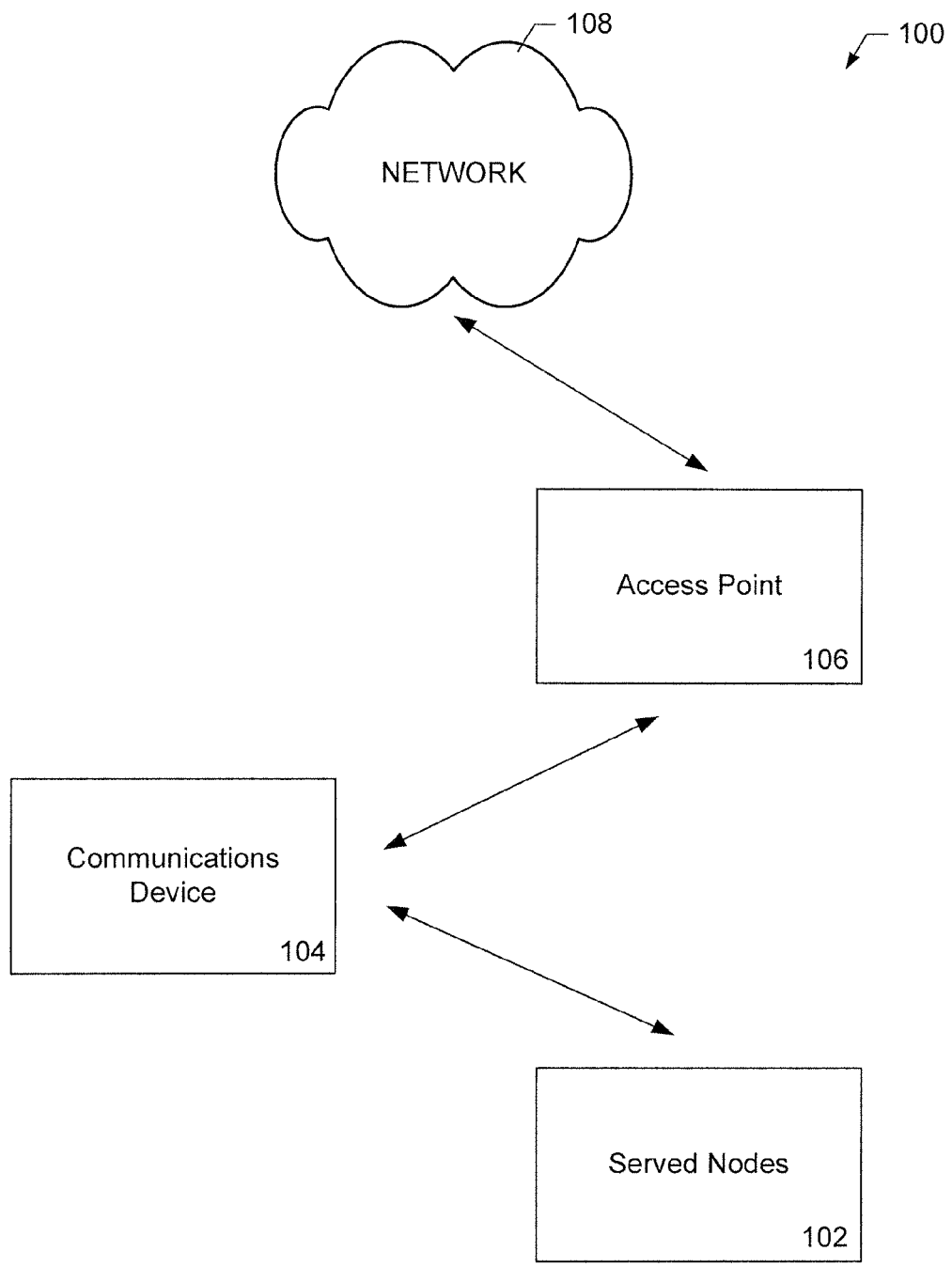
FIG. 1 illustrates a block diagram of a system for determining a communications window in an instance in which a mobile terminal is configured to function as a gateway for a plurality of served nodes according to some example embodiments of the current invention.

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

The terms "data," "content," "information," and similar terms may be used interchangeably, according to some example embodiments of the present invention, to refer to data capable of being transmitted, received, operated on, displayed, and/or stored. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like.

The term "computer-readable medium" as used herein refers to any medium configured to participate in providing information to a processor, including instructions for execution. Such a medium may take many forms, including, but not limited to a non-transitory computer-readable storage medium (for example, non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a floppy disk, a flexible disk, hard disk, magnetic tape, any other non-transitory magnetic medium, a compact disc read only memory (CD-ROM), compact disc compact disc-rewritable (CD-RW), digital versatile disc (DVD), Blu-Ray, any other non-transitory optical medium, punch cards, paper tape, optical mark sheets, any other physical medium with patterns of holes or other optically recognizable indicia, a random access memory (RAM), a programmable read only memory (PROM), an erasable programmable read only memory (EPROM), a FLASH-EPROM, any other memory chip or cartridge, a carrier wave, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

As used herein, the term 'circuitry' refers to all of the following: (a) hardware-only circuit implementations (such as implementations in only analog and/or digital circuitry); (b) to combinations of circuits and computer program product(s) comprising software (and/or firmware instructions stored on one or more computer readable memories), such as (as applicable): (i) to a combination of processor(s) or (ii) to portions of processor(s)/software (including digital signal processor(s)), software, and memory(ies) that work together to cause an apparatus, such as a mobile phone or server, to perform various functions described herein); and (c) to circuits, such as, for example, a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, other network device, and/or other computing device.

The systems and methods as described herein are configured to reduce power consumption by a communications device by causing served nodes and/or internal application to synchronize their communications to particular communications windows designated by communications device to enable the radio interface of the communications device to be activated periodically and/or in an instance in which the communications device has data to be transmitted. The communications device as described herein is configured to operate as a gateway. For example, the communications window may be used for delay tolerant, delay tolerant networking (DTN) and periodical messages from the served nodes and/or the internal applications. As the served nodes are informed of future communications windows, the served nodes may then optimize their active time to correspond with the communications device.

In some example embodiments, the served nodes may only be partially synchronized. However, even in a partial synchronization situation the communications device is likely to record a reduction in battery consumption.

In the case that a time sensitive message is received by the communications device functioning as a gateway, the communications device may activate the radio interface to transmit the time sensitive message. Simultaneously the communications device may also notify the other served nodes and/or internal applications so as to ensure any other transmissions are synched with the time sensitive message and/or to enable the served nodes and/or internal applications take advantage of the radio interface being activated.

Referring now to FIG. 1, FIG. 1 illustrates a block diagram of a system 100 for determining a communications window in an instance in which a mobile terminal is configured to function as a gateway for a plurality of served nodes, such as served nodes 102. It will be appreciated that the system 100 as well as the illustrations in other figures are each provided as an example of some embodiments and should not be construed to narrow the scope or spirit of the disclosure in any way. In this regard, the scope of the disclosure encompasses many potential embodiments in addition to those illustrated and described herein. As such, while FIG. 1 illustrates one example of a configuration of a system for optimizing the power consumption of a communications device, such as communications device 104; numerous other configurations may also be used to implement embodiments of the present invention.

The system 100 may include one or more communications devices 104 and one or more access points 106. The system 100 may further comprise a network 108. The network 108 may comprise one or more wireline networks, one or more wireless networks, or some combination thereof. The network 108 may, for example, comprise a serving network (for example, a serving cellular radio network) for one or more communications devices 104. The network 108 may comprise, in certain embodiments, one or more of the served nodes 102, communications devices 104 and/or access points 106 themselves. According to example embodiments, the network 108 may comprise the Internet. The network 108 may comprise, in some embodiments, a Content Delivery Network (CDN), which may also be referred to as a Content Distribution Network. In various embodiments, the network 108 may comprise a wired access link connecting one or more communications devices 104 to the rest of the network 108 using, for example, Digital Subscriber Line (DSL) technology. In some embodiments, the network 108 may comprise a public land mobile network (for example, a cellular network), such as may be implemented by a network operator (for example, a cellular access provider). The network 108 may operate in accordance with universal terrestrial radio access network (UTRAN) standards, evolved UTRAN (E-UTRAN) standards, current and future implementations of Third Generation Partnership Project (3GPP) LTE (also referred to as LTE-A) standards, current and future implementations of International Telecommunications Union (ITU) International Mobile Telecommunications-Advanced (IMT-A) systems standards, and/or the like. It will be appreciated, however, that where references herein are made to a network standard and/or terminology particular to a network standard, the references are provided merely by way of example and not by way of limitation.

According to various embodiments, one or more communications devices 104 may be configured to connect directly with one or more access points 106 via, for example, an air interface without routing communications via one or more elements of the network 108. Alternatively, one or more of the communications devices 104 may be configured to communicate with one or more of the access points 106 over the network 108. In this regard, the access points 106 may comprise one or more nodes of the network 108. For example, in some example embodiments, the access points 106 may be at least partially embodied on one or more computing devices that comprise an element of a radio access network (RAN) portion of the network 108. In this regard, the access points 106 may, for example, be at least partially embodied on an access point of the network 108 (for example, a macrocell, microcell, picocell, femtocell, closed subscriber group (CSG) cell, base station, base transceiver station (BTS), node B, evolved node B (eNB), group owner, mesh station (STA), mesh point, and/or the like), which may, for example be configured to provide access to the network 108 (for example, via a radio uplink) to one or more of the communications devices 104. In some embodiments, the access points 106 may comprise an Access Network Discovery and Selection Function (ANDSF), and/or the like. Accordingly, each of the access points 106 may comprise a network node or a plurality of network nodes collectively configured to perform one or more operations attributed to the access point 106 as described with respect to various example embodiments disclosed herein. According to various embodiments, one or more served nodes 102 may be configured to connect directly with one or more communication devices 104 via, for example, Bluetooth, Zigbee, wireless fidelity (WiFi) Low Power, Cellular Radio, WiFi, DTN or the like. Alternatively or additionally, one or more served nodes 102 may be configured to connect directly with one or more communication devices 104 via non IP based communications such as by using application specific protocols.

A served node 102 and/or a communications device 104 may be embodied as any computing device, such as, for example, a desktop computer, laptop computer, mobile terminal, mobile computer, mobile phone, smartphone, user equipment, mobile communication device, tablet computing device, pad, game device, digital camera/camcorder, audio/video player, television device, radio receiver, digital video recorder, positioning device, wrist watch, portable digital assistant (PDA), fixed transceiver device (for example, attached to traffic lights, energy meters, light bulbs, and/or the like), a sensor, an actuator, a chipset, an apparatus comprising a chipset, any combination thereof, and/or the like.

Figure 2:
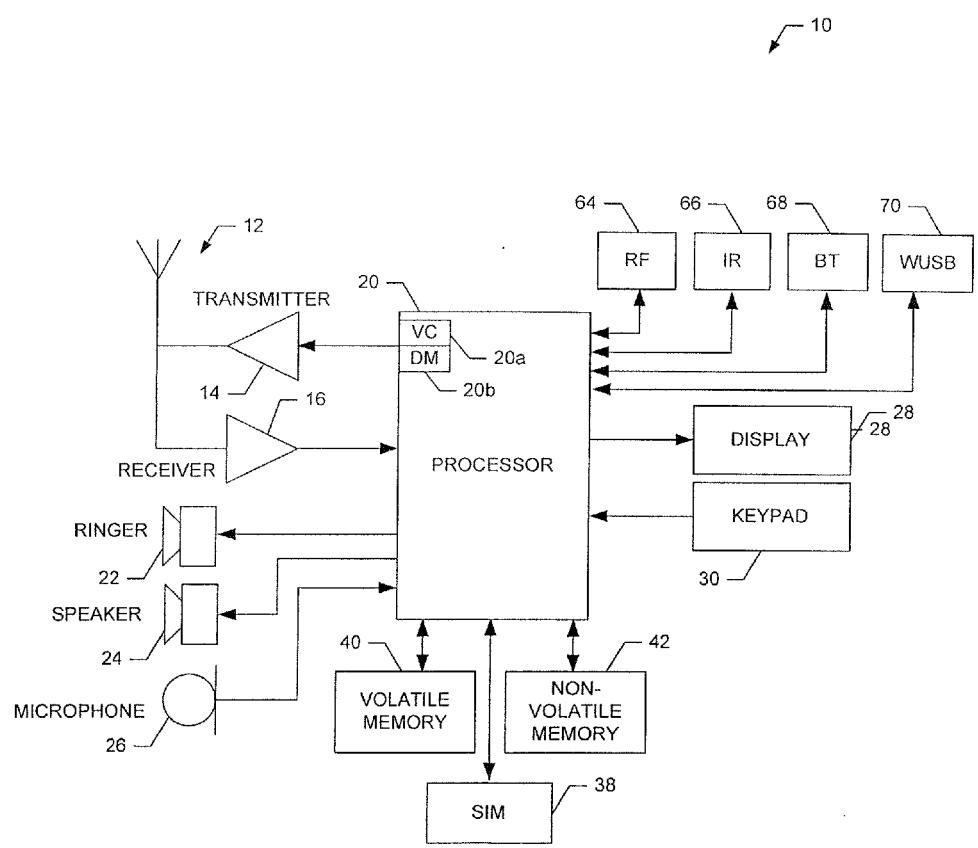
FIG. 2 illustrates a block diagram of a mobile terminal representative of one embodiment of a communications device.

In some example embodiments, a communications device 104 may be embodied as an example mobile terminal, such as that illustrated in FIG. 2. In this regard, FIG. 2 illustrates a block diagram of a mobile terminal 10 representative of one embodiment of a communications device 104. It should be understood, however, that the mobile terminal 10 illustrated and hereinafter described is merely illustrative of one type of computing device (for example, communications device 104) that may implement and/or benefit from various embodiments and, therefore, should not be taken to limit the scope of the disclosure. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some example embodiments the processor 20 may comprise a plurality of processors. These signals sent and received by the processor 20 may include signaling information in accordance with an air interface standard of an applicable cellular system, and/or any number of different wireline or wireless networking techniques, comprising but not limited to WiFi, wireless local access network (WLAN) techniques such as Bluetooth™ (BT), Ultra-wideband (UWB), Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various mobile communication protocols, Internet Protocol Multimedia Subsystem (IMS) communication protocols (for example, session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols such as LTE Advanced and/or the like as well as similar wireless communication protocols that may be developed in the future. The mobile terminal may be capable in operating with various IEEE and IETF standards, for example IEEE 802.11 standard for wireless fidelity (Wi-Fi) or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), Constrained Application Protocol (CoAP) and/or the like. The mobile terminal 10 may be capable of using Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (for example, software and/or firmware) stored on a memory accessible to the processor 20 (for example, volatile memory 40, non-volatile memory 42, and/or the like). The mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display, a joystick, and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to low power/energy or ultra-low power/energy Bluetooth™ technology (for example, Bluetooth Low Energy and/or Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. The mobile terminal may be capable of transmitting and/or receiving data from electronic devices according to various wireless networking techniques, including 6LoWpan, WiFi, WiFi low power, WLAN techniques such as IEEE 802.11 techniques, IEEE 802.15 techniques, IEEE 802.16 techniques, and/or the like.

The mobile terminal 10 may comprise memory, such as a removable or non-removable subscriber identity module (SIM) 38, a soft SIM 38, a fixed SIM 38, a removable or non-removable universal subscriber identity module (USIM) 38, a soft USIM 38, a fixed USIM 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42.

For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (for example, hard disks, floppy disk drives, magnetic tape, etc.), optical disc drives and/or media, non-volatile random access memory (NVRAM), and/or the like. Like volatile memory 40 non-volatile memory 42 may comprise a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Figure 3:
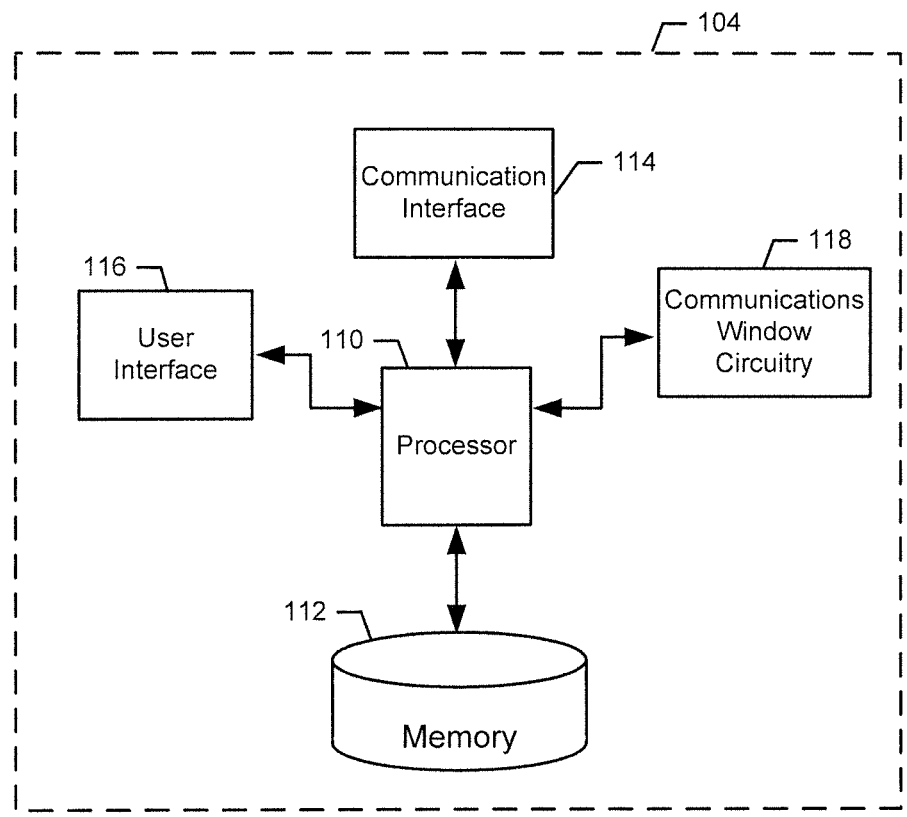
FIG. 3 illustrates a block diagram of a communications device according to some example embodiments of the current invention.

Referring now to FIG. 3, FIG. 3 illustrates a block diagram of a communications device 104 according to an example embodiment. In the example embodiment, the communications device 104 may comprise various means for performing the various functions herein described. These means may comprise one or more of a processor 110, memory 112, communication interface 114, user interface 116, or communications window circuitry 118. The means of the communications device 104 as described herein may be embodied as, for example, circuitry, hardware elements (for example, a suitably programmed processor, combinational logic circuit, and/or the like), a computer program product comprising computer-readable program instructions (for example, software or firmware) stored on a computer-readable medium (for example memory 112) that is executable by a suitably configured processing device (for example, the processor 110), or some combination thereof.

In some example embodiments, one or more of the means illustrated in FIG. 3 may be embodied as a chip or chip set. In other words, the communications device 104 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 110, memory 112, communication interface 114, user interface 116, and/or communications window circuitry 118 may be embodied as a chip or chip set. The communications device 104 may therefore, in some example embodiments, be configured to implement embodiments of the present invention on a single chip or as a single "system on a chip." As another example, in some example embodiments, the communications device 104 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 3 as a single processor, in some embodiments the processor 110 may comprise a plurality of processors. The plurality of processors may be in operative communication with each other and may be collectively configured to perform one or more functionalities of the communications device 104 as described herein. The plurality of processors may be embodied on a single computing device or distributed across a plurality of computing devices collectively configured to function as the communications device 104. In embodiments wherein the communications device 104 is embodied as a mobile terminal 10, the processor 110 may be embodied as or comprise the processor 20. In some example embodiments, the processor 110 is configured to execute instructions stored in the memory 112 or otherwise accessible to the processor 110. These instructions, when executed by the processor 110, may cause the communications device 104 to perform one or more of the functionalities of the communications device 104 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. In this regard, the memory 112 may comprise one or more tangible and/or non-transitory computer-readable storage media that may include volatile and/or non-volatile memory. Although illustrated in FIG. 3 as a single memory, the memory 112 may comprise a plurality of memories. The plurality of memories may be embodied on a single computing device or may be distributed across a plurality of computing devices collectively configured to function as the communications device 104. In various example embodiments, the memory 112 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the communications device 104 is embodied as a mobile terminal 10, the memory 112 may comprise the volatile memory 40 and/or the non-volatile memory 42. The memory 112 may be configured to store information, data, applications, instructions, or the like for enabling the communications device 104 to carry out various functions in accordance with various example embodiments. For example, in some example embodiments, the memory 112 is configured to buffer input data for processing by the processor 110. Additionally or alternatively, the memory 112 may be configured to store program instructions for execution by the processor 110. The memory 112 may store information in the form of static and/or dynamic information. This stored information may be stored and/or used by the communications window circuitry 118 during the course of performing its functionalities.

The communication interface 114 may be embodied as any device or means embodied in circuitry, hardware, a computer program product comprising computer readable program instructions stored on a computer readable medium (for example, the memory 112) and executed by a processing device (for example, the processor 110), or a combination thereof that is configured to receive and/or transmit data from/to another computing device. In an example embodiment, the communication interface 114 may be at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. In some example embodiments, the communications interface 114 takes the form of a modem. The communication interface 114 may be configured to receive and/or transmit data using any protocol that may be used for communications between computing devices. In this regard, the communication interface 114 may be configured to receive and/or transmit data using any protocol that may be used for transmission of data over a wireless network, cellular radio network, wireline network, some combination thereof, or the like by which the communications device 104 and one or more computing devices or computing resources may be in communication. As an example, the communication interface 114 may be configured to enable communication between the communications device 104 and another device, such as another communications device 104. As a further example, the communication interface 114 may be configured to enable communication with an access point 106 via the network 108, as well as with the served nodes 102. The communication interface 114 may additionally be in communication with the memory 112, user interface 116, and/or communications window circuitry 118, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. In embodiments wherein the user interface 116 comprises a touch screen display, the user interface 116 may additionally be configured to detect and/or receive indication of a touch gesture or other input to the touch screen display. The user interface 116 may be in communication with the memory 112, communication interface 114, and/or communications window circuitry 118, such as via a bus.

The communications window circuitry 118 may be embodied as various means, such as circuitry, hardware, a computer program product comprising computer readable program instructions stored on a computer readable medium (for example, the memory 112) and executed by a processing device (for example, the processor 110), or some combination thereof and, in some embodiments, is embodied as or otherwise controlled by the processor 110. In embodiments wherein the communications window circuitry 118 is embodied separately from the processor 110, the communications window circuitry 118 may be in communication with the processor 110. The communications window circuitry 118 may further be in communication with one or more of the memory 112, communication interface 114, or user interface 116, such as via a bus.

In some example embodiments, the communications window circuitry 118 may be configured to provide a communications window for a plurality of served nodes, such as served nodes 102, as well as a plurality of internal applications executing on the communications device 104 that are configured to communicate with the access point 106 via the communications interface 114. For example, a communications device 104 may receive packets from multiple served nodes 102 periodically, as well as, attempt to send packets for internal applications; however all of these transmissions may be out of sync, thus resulting in excess drain on the battery power. As is described by the systems and methods herein, the communications window circuitry 118 is configured such that packets are received from both the plurality of served nodes 102 and the internal application in the same or similar communications window and thus, the communications window circuitry 118 activates the communications interface 114 as infrequently as possible to save energy resources.

In some example embodiments, the communications window circuitry 118 may be configured to synchronize a communications timing interval of internal applications and/or served nodes 102. For example, the communications window circuitry 118 may be configured to indicate to the served nodes, for example the served nodes 102, that are currently connected to the communications device 104, future communications windows in which the communications interface 114 is configured to activate a connection with the access point 106. This indication enables the served nodes 102 to synchronize future communications by the served nodes 102 in order to reduce power consumption. Alternatively or additionally, in an instance in which the communications interface 114 is required to connect to the access point 106 outside of the aforementioned communications window, the communications window circuitry 118 may also signal to internal applications and/or served nodes 102 that a communications window is currently available.

In some example embodiments, communications window circuitry 118 may cause a delay in forwarding of packets received from the served nodes 102 so as to synchronize the received packets with the packets generated by the internal applications. For example, the communications window circuitry 118 may activate the communications interface 114 in an instance in which a quantity or size of packets are currently stored in the memory 112 exceed a predetermined threshold and are ready for transmission to the access point 106 via the communications interface 114. In some cases, the processor 110 may interact with an application layer, for example by hosting an application layer gateway for a served node application to store packets in the memory 112 prior to an available communications window. Alternatively or additionally, the communications window circuitry 118 may cause a delay in forwarding packets generated by one or more internal applications so as to synchronize the internal applications with upcoming scheduled communications by the one or more served nodes.

In some example embodiments, the communications window circuitry 118 may be configured to determine the communications window and cause the determined communications window to be transmitted to the served nodes 102. In some example embodiments, the communications window may be predetermined by the communications window circuitry 118. For example, the communications window may be hard coded into the communications device 104 or may be set based on battery life, network traffic, and/or the like.

Alternatively or additionally, the communications window circuitry 118 may be configured to determine an interval (for example interval and/or frequency of transmission by a served node) used by the most active served node (for example highest frequency of transmission) and cause the communications window to mirror the determined interval of the most active served node. For example, a particular served node may be configured to transmit packets every 20 seconds, and thus the communications window circuitry 118 may signal to all other served nodes 102 that the communications window will occur every 20 seconds. In some example embodiments, the communications window circuitry 118 may be configured to modify the communications window interval in an instance in which the served node with an interval that is most active changes or is surpassed by another more active served node. Alternatively or additionally, in an instance in which the network 108 is using a duty cycle scheme, the communications window of the communications device 104 may be configured to be synchronized with the network's duty cycle.

In some example embodiments, the communications window circuitry 118 may only modify a partial set of served nodes 102 and internal programs. For example, a served node 102 may not be listening for the communications window or any transmission by the communications device 104. In such cases, the communications window circuitry 118 may be configured to cause the partial set served nodes 102 and the internal applications to synchronize with the communications window and then may continue to attempt to synchronize the remaining served nodes 102 or internal applications.

Alternatively or additionally, the served node 102 may be configured to adapt or modify its frequency of transmission of packets to match the communications window. However, the served node 102 may also decrease it sampling rate to match the communications window and/or the served node 102 may collect samples and send those samples during a future communications window.

In some example embodiments, the communications window circuitry 118 may cause the transmission of a communications via the communications interface 114 use an Internet Protocol layer, a Layer 2 mechanism and/or the like. For example, the communication device may function as a IPv6 Internet gateway and may function in accordance with IPv6 protocols.

In some example embodiments, the communications window circuitry 118 is configured to cause a ICMPv6 Router Advertisement (RA) (see for example RFC4861, which is hereby incorporated by reference herein) to be generated and transmitted via the communications interface 114. The RA may be configured to indicate that the current time (for example the time the RA is received by a served node 102) is the start of the communications window. However in other example embodiments, the RA may define a future communications window. For example, the RA message may indicate whether the communications window occurs in an instance in which the RA is received by a served node (for example a R bit) or at another time (for example a P bit). The RA may also indicate an interval between communications windows (for example by using an interval field which may be indicated in milliseconds), the next communications window (for example a time to next field which may be indicated in milliseconds) and/the length of the communication window (for example a duration field which may be indicated in milliseconds). One example of an RA message may include, but is not limited to:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |  Length = 2   |R|P|         Reserved          |
+-+-+-+-+-+-+-+-+-+-+-+-+-+-+-+-+-+-+-+-+-+-+-+-+-+-+-+-+-+-+-+-+
|                         Interval (ms)                         |
+-+-+-+-+-+-+-+-+-+-+-+-+-+-+-+-+-+-+-+-+-+-+-+-+-+-+-+-+-+-+-+-+
|                           Next (ms)                           |
+-+-+-+-+-+-+-+-+-+-+-+-+-+-+-+-+-+-+-+-+-+-+-+-+-+-+-+-+-+-+-+-+
|                         Duration (ms)                         |
+-+-+-+-+-+-+-+-+-+-+-+-+-+-+-+-+-+-+-+-+-+-+-+-+-+-+-+-+-+-+-+-+
```

In some example embodiments, the communications window circuitry 118 may cause the served nodes to transmit information at different intervals within the communications window to avoid congestion. For example a random delay may be assigned to each served node 102, such as beginning of window+random delay (0 . . . ¼th of window duration). Alternatively or additionally, the served node may configure its timers each time it receives an RA and may request an RA from the communications device 104 by sending a router solicitation.

In some example embodiments the served nodes 102 may be configured to add a random delay to the signaled communications window before sending a transmission. For example, in an instance in which the communications device 104 multicasts an RA message to a plurality of served nodes 102, each served node 102 may add a random delay to the start of the communications window to avoid congestion.

In some example embodiments, the served node 102 may be configured to cause a CoAP GET request to be sent to the communications device 104, wherein the CoAP GET request is configured to request communications window parameters, such as a start time, interval, and/or duration. The communications device 104 may be configured to cause a CoAP Response to be sent to the served node 102 containing the communications window parameters. Furthermore, in some example embodiments the communications device 104 may be caused to utilize a CoAP POST method to cause communications window parameters to pushed to the served node 102. Furthermore, in one embodiment the communications window parameters are configured alongside other configuration information provided for the served node 102. One example of CoAP GET request and response messages may include, but is not limited to:

```
CoAP REQ: GET /config/app
CoAP RES: 2.05 "Content"
[{ window_interval : "in ms",
    next_window_start : "in ms",
    window_duration : "in ms"
}]
```

Alternatively or additionally, the served node 102 need not transmit during a communications window. To that end, the communications window circuitry 118 may only cause the communications interface 114 to connect to the access point 106 in instance in which at least one served node 102 or internal application has provided a packet or message for transmission.

Figure 4:
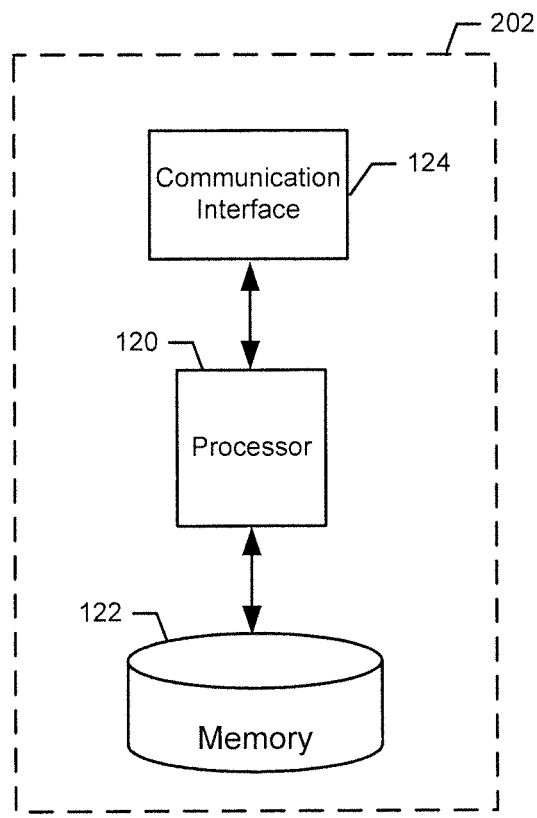
FIG. 4 illustrates a block diagram of a served node and/or an access point according to some example embodiments of the current invention.

Referring now to FIG. 4, FIG. 4 illustrates a block diagram of an apparatus 202 according to an example embodiment. In some examples the served node 102 and/or the access point 106 may be embodied by the apparatus 202. In the example embodiment, the apparatus 202 may comprise various means for performing the various functions herein described. These means may comprise one or more of a processor 120, memory 122, and/or communications interface 124. The means of the apparatus 202 as described herein may be embodied as, for example, circuitry, hardware elements (for example, a suitably programmed processor, combinational logic circuit, and/or the like), a computer program product comprising computer-readable program instructions (for example, software or firmware) stored on a computer-readable medium (for example, memory 122) that is executable by a suitably configured processing device (for example, the processor 120), or some combination thereof.

In some example embodiments, one or more of the means illustrated in FIG. 4 may be embodied as a chip or chip set. In other words, the apparatus 202 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 120, memory 122, and/or communication interface 124 may be embodied as a chip or chip set. The apparatus 202 may therefore, in some example embodiments, be configured to implement embodiments of the present invention on a single chip or as a single "system on a chip." As another example, in some example embodiments, the apparatus 202 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 120 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 4 as a single processor, in some embodiments the processor 120 may comprise a plurality of processors. The plurality of processors may be in operative communication with each other and may be collectively configured to perform one or more functionalities of the apparatus 202 as described herein. The plurality of processors may be embodied on a single computing device or distributed across a plurality of computing devices collectively configured to function as the apparatus 202. In some example embodiments, the processor 120 may be configured to execute instructions stored in the memory 122 or otherwise accessible to the processor 120. These instructions, when executed by the processor 120, may cause the apparatus 202 to perform one or more of the functionalities of the apparatus 202 as described herein. As such, whether configured by hardware or software methods, or by a combination thereof, the processor 120 may comprise an entity capable of performing operations according to embodiments of the present invention while configured accordingly. Thus, for example, when the processor 120 is embodied as an ASIC, FPGA or the like, the processor 120 may comprise specifically configured hardware for conducting one or more operations described herein. Alternatively, as another example, when the processor 120 is embodied as an executor of instructions, such as may be stored in the memory 122, the instructions may specifically configure the processor 120 to perform one or more algorithms and operations described herein.

The memory 122 may comprise, for example, volatile memory, non-volatile memory, or some combination thereof. In this regard, the memory 122 may comprise a non-transitory computer-readable storage medium. Although illustrated in FIG. 4 as a single memory, the memory 122 may comprise a plurality of memories. The plurality of memories may be embodied on a single computing device or may be distributed across a plurality of computing devices collectively configured to function as the apparatus 202. In various example embodiments, the memory 122 may comprise a hard disk, random access memory, cache memory, flash memory, a compact disc read only memory (CD-ROM), digital versatile disc read only memory (DVD-ROM), an optical disc, circuitry configured to store information, or some combination thereof. The memory 122 may be configured to store information, data, applications, instructions, or the like for enabling the apparatus 202 to carry out various functions in accordance with various example embodiments. For example, in some example embodiments, the memory 122 may be configured to buffer input data for processing by the processor 120. Additionally or alternatively, the memory 122 may be configured to store program instructions for execution by the processor 120. The memory 122 may store information in the form of static and/or dynamic information.

The communication interface 124 may be embodied as any device or means embodied in circuitry, hardware, a computer program product comprising computer readable program instructions stored on a computer readable medium (for example, the memory 122) and executed by a processing device (for example, the processor 120), or a combination thereof that is configured to receive and/or transmit data from/to another computing device. In an example embodiment, the communication interface 124 may be at least partially embodied as or otherwise controlled by the processor 120. In this regard, the communication interface 124 may be in communication with the processor 120, such as via a bus. The communication interface 124 may include, for example, an antenna, a transmitter, a receiver, a transceiver and/or supporting hardware or software for enabling communications with one or more remote computing devices. The communication interface 124 may be configured to receive and/or transmit data using any protocol that may be used for communications between computing devices. In this regard, the communication interface 124 may be configured to receive and/or transmit data using any protocol that may be used for transmission of data over a wireless network, wireline network, some combination thereof, or the like by which the apparatus 202 and one or more computing devices or computing resources may be in communication. The communication interface 124 may additionally be in communication with the processor 120 and/or the memory 122, such as via a bus.

Figure 5:
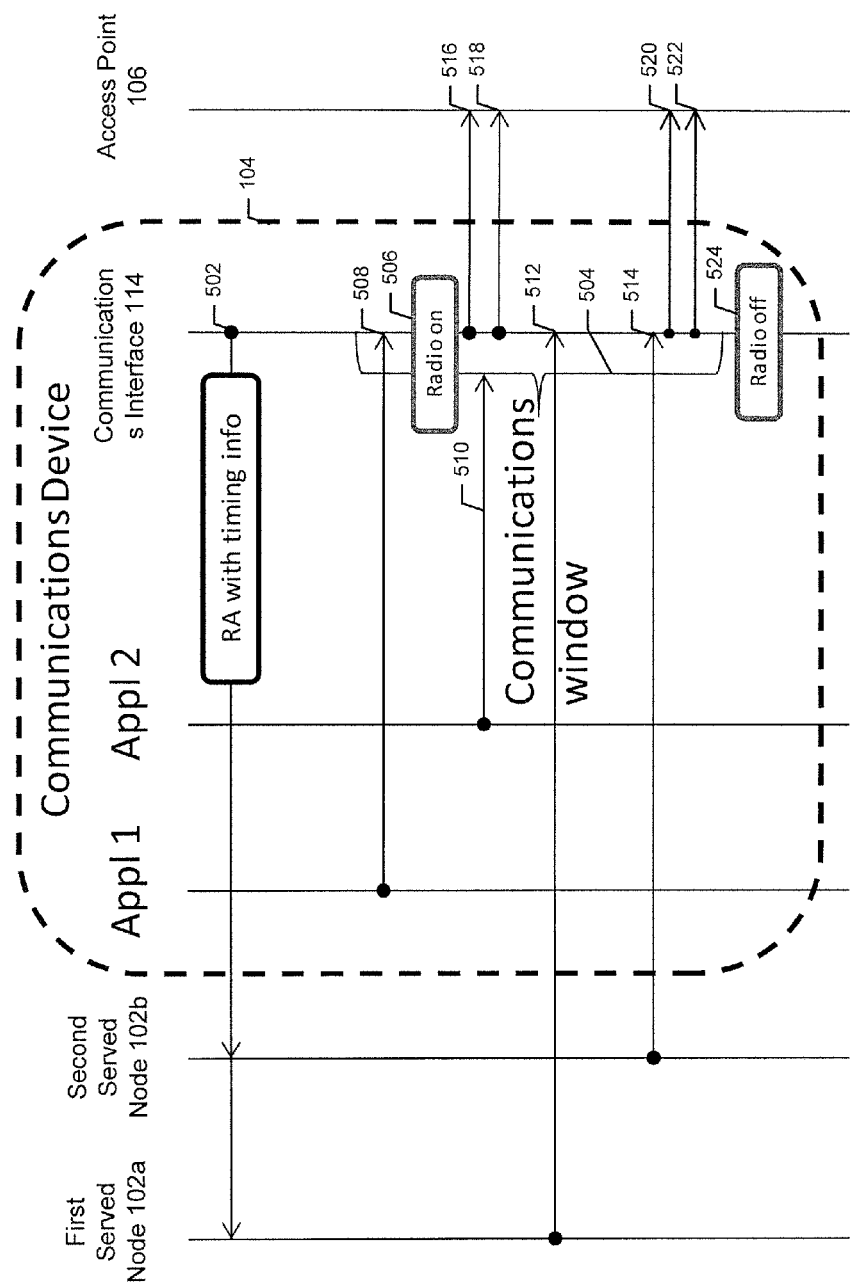
FIG. 5 illustrates an example signal flow diagram showing a signal that is used to indicate a communications window according to some example embodiments of the current invention.

FIG. 5 illustrates an example signal flow diagram showing an RA signal that is used to indicate a communications window to the served nodes 102a and 102b. As is shown with respect to FIG. 5, the communications window circuitry (118 of FIG. 3) may cause the communications interface to generate an RA and cause the RA to be transmitted to a first served node 102a and a second served node 102b. Depending on the connection between the served nodes 102a and 102b and the communications device 104, the RA may be transmitted as a point-to-point message (for example Bluetooth Low Energy) or the RA may be multicast to the served nodes 102a and 102b (for example WiFi). As is discussed herein, the RA provides timing, interval and/or duration information of the communications window 504 to the first served node 102a and the second served node 102b. In some example embodiments, the internal applications may also provide an indication of the communications window by the communications window circuitry 118. The communication interface 114 may then activate the radio interface at block 506 in an instance in which the first signal 508 is received during the communications window 504. The first application may transmit a packet in signal 508 and the second application in signal 510. Packets are received from the first served node 102a in signal 512 and the second served node 102b in signal 514. The received packets from the internal applications and the first served node 102a and the second served node 102b may then be caused to be transmitted to the access point in signals 516-522. After signals 516 and 518 have been transmitted, the communications interface 114 is configured to deactivate the radio interface at block 524.

Figure 6:
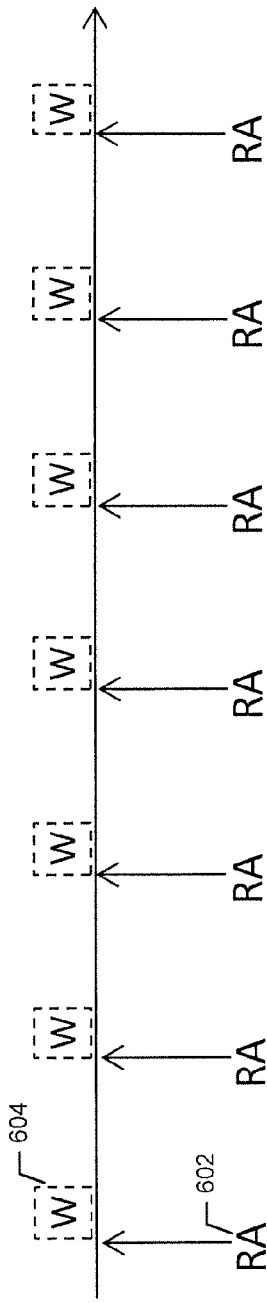
FIG. 6 illustrates an example message indicating an immediate occurrence of a communications window according to example embodiments of the present invention.
Figure 7:
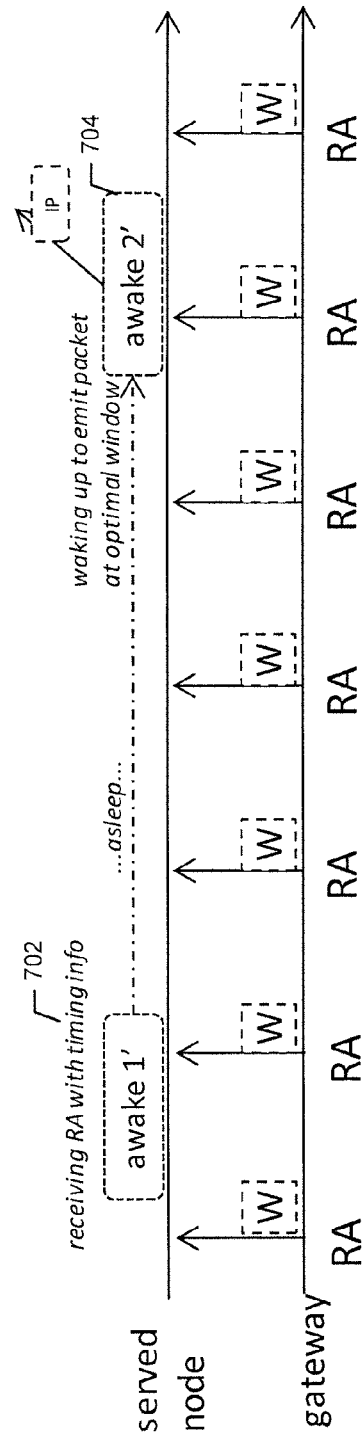
FIG. 7 illustrates a message indicating a future communications window according to some example embodiments of the invention.

FIG. 6 illustrates an example embodiment of the present invention showing an RA message 602 that signals an immediate occurrence of a communications window 604. FIG. 7 illustrates an example embodiment of the present invention in which a RA message is received at block 702 indicating a future communications window as is shown with reference to block 704. Thus, this example embodiment illustrates the ability to communicate a future communications window to a served node, which enables a served node to remain in an inactive state until the served node has a packet to transmit.

Figure 8:
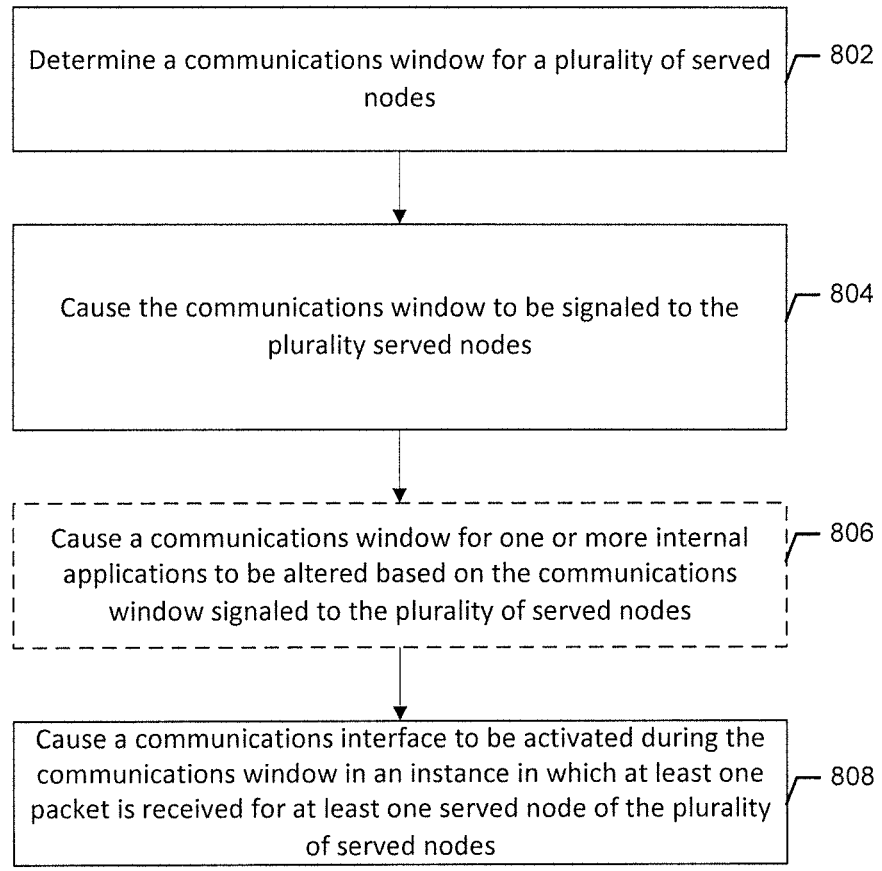
FIG. 8 illustrates a flowchart according to an example method configured to be executed by a communications device for determining a communications window according to some example embodiments of the current invention.

FIG. 8 illustrates an example flowchart of a system, method, and computer program product according to example embodiments of the invention. It will be understood that each block of the flowchart, and combinations of blocks in the flowchart, may be implemented by various means, such as hardware and/or a computer program product comprising one or more computer-readable mediums (as opposed to a computer-readable transmission medium which describes a propagating signal) having one or more computer program code instructions, program instructions, or executable computer-readable program code instructions stored therein. For example, one or more of the procedures described herein may be embodied by computer program instructions of a computer program product. In this regard, the computer program product(s) that embodies the procedures described herein may be stored by one or more memory devices (for example, memory 112, memory 122, volatile memory 40, or non-volatile memory 42) of a mobile terminal, server, or other computing device (for example, the communications device 104, access point 106) and executed by a processor (for example, the processor 110, the processor 120 or processor 20) in the computing device. In some embodiments, the computer program instructions comprising the computer program product(s) that embodies the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s).

Further, the computer program product may comprise one or more computer-readable memories on which the computer program instructions may be stored such that the one or more computer-readable memories can direct a computer or other programmable apparatus to function in a particular manner, such that the computer program product may comprise an article of manufacture which implements the function specified in the flowchart block(s). The computer program instructions of one or more computer program products may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together.

Accordingly, execution of instructions associated with the operations of the flowchart by a processor, or storage of instructions associated with the blocks or operations of the flowchart in a computer-readable storage medium, support combinations of operations for performing the specified functions. It will also be understood that one or more operations of the flowchart, and combinations of blocks or operations in the flowchart, may be implemented by special purpose hardware-based computer systems and/or processors which perform the specified functions, or combinations of special purpose hardware and program code instructions.

FIG. 8 illustrates a flowchart according to an example method configured to be executed by a communications device for determining a communications window according to some example embodiments of the current invention. As is shown in operation 802, the communications device 104, may comprise means, such as the processor 110, the communications window circuitry 118, or the like, for determining a communications window for a plurality of served nodes. In some example embodiments, the communications window may be predetermined or programmed based on battery life, service quality, sensor types, network traffic and/or the like.

In other example embodiments, the processor 110, the communications interface 114, the communications window circuitry 118, or the like may determine a served node of the plurality of served nodes that has transmitted the highest frequency of transmissions in a predetermined period and/or cause the communications window to be adjusted based on a communications interval used by the served node that has transmitted the highest frequency of transmissions in the predetermined period Alternatively or additionally, processor 110, the communications interface 114, the communications window circuitry 118, or the like may determine a served node of the plurality of served nodes that is not configured to receive the signaled communications window; and cause the communications window to be adjusted to a communications interval used by the served node that is not configured to receive the signaled communications window.

As is shown in operation 804, the communications device 104, may comprise means, such as the processor 110, the communications interface 114, the communications window circuitry 118, or the like, for causing the communications window to be signaled to the plurality served nodes. In some example embodiments, a router advertisement is configured to be signaled to the plurality of served nodes to indicate the communications window. For example, the router advertisement may comprise an indication of an interval timing of the communications window, a timing of a next communications window and a duration of the communications window. Alternatively or additionally, an indication of a communications window may also be signaled via CoAP, HTTP, Dynamic Host Configuration Protocol version 4 (DHCPv4), Dynamic Host Configuration Protocol version 6 (DHCPv6) and/or the like. In some example embodiments, the communications window may include a predetermined random delay from the start of the communications window for each of the plurality of served nodes.

As is shown in operation 806, the communications device 104, may comprise means, such as the processor 110, the communications window circuitry 118, or the like, for causing a communications window for one or more internal applications to be altered based on the communications window signaled to the plurality of served nodes. As is shown in operation 808, the communications device 104, may comprise means, such as the processor 110, the communications window circuitry 118, or the like, for causing a communications interface to be activated during the communications window in an instance in which at least one packet is received for at least one served node of the plurality of served nodes.

The above described functions may be carried out in many ways. For example, any suitable means for carrying out each of the functions described above may be employed to carry out embodiments of the invention. In example embodiments, a suitably configured processor (for example, the processor 110 and/or processor 120) may provide all or a portion of the elements of the invention. In other embodiments, all or a portion of the elements of the invention may be configured by and operate under control of a computer program product. The computer program product for performing the methods of embodiments of the invention may comprise a computer-readable storage medium, such as the non-volatile storage medium (for example, the memory 112 and/or memory 122), and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method comprising:
   determining a communications window for a plurality of served nodes; and
   causing the communications window to be signaled to the plurality of served nodes,
   wherein a router advertisement is configured to be signaled to the plurality of served nodes, and
   wherein the router advertisement comprises an indication of an interval timing of the communications window, a timing of a next communications window and a duration of the communications window.

2. The method according to claim 1, further comprising:
   causing a communications window for one or more internal applications to be altered based on the communications window signaled to the plurality of served nodes.

3. The method according to claim 1, further comprising;
   determining a served node of the plurality of served nodes that has transmitted a highest frequency of transmissions in a predetermined period; and
   causing the communications window to be adjusted based on a communications interval used by the served node that has transmitted the highest frequency of transmissions in the predetermined period.

4. The method according to claim 1, further comprising:
   determining a served node of the plurality of served nodes that is not configured to receive the signal comprising the communications window; and
   causing the communications window to be adjusted to a communications interval used by the served node that is not configured to receive the signal comprising the communications window.

5. The method according to claim 1, wherein the router advertisement comprises a IPv6 router advertisement.

6. The method according claim 1, further comprising:
   causing the router advertisement to be signaled at the beginning of a communications window.

7. The method according to claim 1, wherein the communications window includes a predetermined delay from a start time of the communications window for each of the plurality of served nodes.

8. The method according to claim 1, further comprising:
   causing a communications interface to be activated during the communications window in an instance in which at least one packet is received for at least one served node of the plurality of served nodes.

9. The method according to claim 1, further comprising:
   causing the communications window to be signaled via at least one of a layer 2 protocol, an wireless application protocol, hypertext transfer protocol, dynamic host configuration protocol version 4, dynamic host configuration protocol version 6 or a constrained application protocol.

10. The method according to claim 1, wherein the communications interface is a cellular radio interface.

11. An apparatus comprising;
    at least one processor; and
    at least one memory including computer program code, the at least one memory and the computer program code configured to, with the at least one processor, cause the apparatus to at least:
    determine a communications window for a plurality of served nodes; and
    cause the communications window to be signaled to the plurality of served nodes,
    wherein a router advertisement is configured to be signaled to the plurality of served nodes, and
    wherein the router advertisement comprises an indication of an interval timing of the communications window, a timing of a next communications window and a duration of the communications window.

12. The apparatus according to claim 11, wherein the at least one memory including the computer program code is further configured to, with the at least one processor, cause the apparatus to:
    cause a communications window for one or more internal applications to be altered based on the communications window signaled to the plurality of served nodes.

13. The apparatus according to claim 11, wherein the at least one memory including the computer program code is further configured to, with the at least one processor, cause the apparatus to:
- determine a served node of the plurality of served nodes that has transmitted a highest frequency of transmissions in a predetermined period; and
- cause the communications window to be adjusted based on a communications interval used by the served node that has transmitted the highest frequency of transmissions in the predetermined period.

14. The apparatus according to claim 11, wherein the at least one memory including the computer program code is further configured to, with the at least one processor, cause the apparatus to:
- determine a served node of the plurality of served nodes that is not configured to understand the signal comprising the communications window; and
- cause the communications window to be adjusted to a communications interval used by the served node that is not configured to receive the signal comprising the communications window.

15. The apparatus according to claim 11, wherein the router advertisement comprises a IPv6 router advertisement.

16. The apparatus according to claim 11, wherein the at least one memory including the computer program code is further configured to, with the at least one processor, cause the apparatus to:
- cause the router advertisement to be signaled at the beginning of a communications window.

17. The apparatus according to claim 11, wherein the communications window includes a predetermined delay from a start time of the communications window for each of the plurality of served nodes.

18. The apparatus according to claim 11, wherein the at least one memory including the computer program code is further configured to, with the at least one processor, cause the apparatus to:
- cause a communications interface to be activated during the communications window in an instance in which at least one packet is received for at least one served node of the plurality of served nodes.

19. The apparatus according to claim 11, wherein the at least one memory including the computer program code is further configured to, with the at least one processor, cause the apparatus to:
- cause the communications window to be signaled via at least one of a layer 2 protocol, an wireless application protocol, hypertext transfer protocol, dynamic host configuration protocol version 4, dynamic host configuration protocol version 6, or a constrained application protocol.

20. The apparatus according to claim 11, wherein the communications interface is a cellular radio interface.

* * * * *